United States Patent [19]

Lotsch et al.

[11] 4,352,932
[45] Oct. 5, 1982

[54] ISOINDOLINE COLORANTS

[75] Inventors: Wolfgang Lotsch, Beindersheim; Reinhard Kemper, Heidelberg; Ernst Schefczik, Ludwigshafen, all of Fed. Rep. of Germany

[73] Assignee: BASF Aktiengesellschaft, Ludwigshafen, Fed. Rep. of Germany

[21] Appl. No.: 227,279

[22] Filed: Jan. 22, 1981

[30] Foreign Application Priority Data

Feb. 27, 1980 [DE] Fed. Rep. of Germany ...... 3007299

[51] Int. Cl.³ .............................................. C09B 57/04
[52] U.S. Cl. ...................... 544/295; 106/22; 106/288 Q; 544/354
[58] Field of Search ................................. 544/295, 354

[56] References Cited

U.S. PATENT DOCUMENTS

| | | | |
|---|---|---|---|
| 3,794,659 | 2/1974 | Leister et al. | 548/159 |
| 4,051,099 | 9/1977 | von der Crone | 260/326.1 |
| 4,159,378 | 6/1979 | Schwander et al. | 544/354 |

FOREIGN PATENT DOCUMENTS

| | | |
|---|---|---|
| 2814526 | 10/1978 | Fed. Rep. of Germany . |
| 1537299 | 9/1967 | France . |
| 2135259 | 5/1972 | France . |
| 2412589 | 12/1978 | France . |
| 2013230A | 8/1979 | United Kingdom . |

*Primary Examiner*—Paul M. Coughlan, Jr.
*Attorney, Agent, or Firm*—Oblon, Fisher, Spivak, McClelland & Maier

[57] ABSTRACT

Isoindoline colorants of the formula

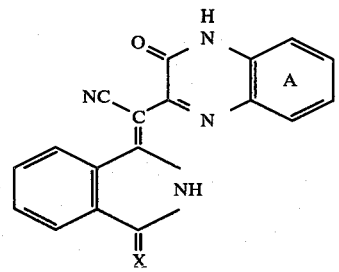

where X is a radical of the formula

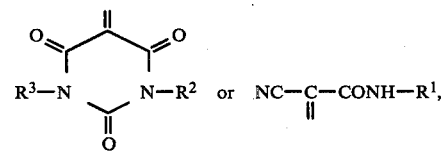

$R^1$ is hydrogen, $C_1$–$C_4$-alkyl, benzyl, phenyl, 1-naphthyl or a 5-membered or 6-membered, unsaturated heterocyclic radical which may or may not be benzo-fused, $R^2$ and $R^3$, independently of one another, are hydrogen, $C_1$–$C_4$-alkyl, benzyl, phenyl or 1-naphthyl, and the ring A and the phenyl, naphthyl and heterocyclic radicals in $R^1$, $R^2$ and $R^3$ can be substituted by groups which do not confer solubility. The colorants give deep, strongly bluish red hues in surface coatings, printing inks and plastics. The colorations have good lightfastness and fastness to migration.

5 Claims, No Drawings

ISOINDOLINE COLORANTS

The present invention relates to novel isoindoline colorants and to their use.

The novel isoindoline colorants have the general formula

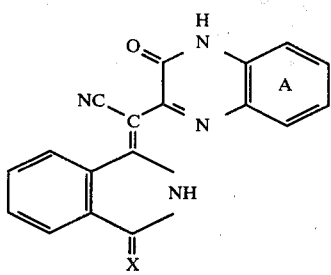

where X is a radical of the formula

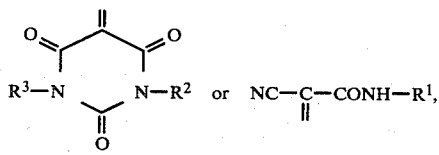

$R^1$ is hydrogen, $C_1$–$C_4$-alkyl, benzyl, phenyl, 1-naphthyl or a 5-membered or 6-membered, unsaturated heterocyclic radical which may or may not be benzo-fused, $R^2$ and $R^3$, independently of one another, are hydrogen, $C_1$–$C_4$-alkyl, benzyl, phenyl or 1-naphthyl, and the ring A and the phenyl, naphthyl and heterocyclic radicals in $R^1$, $R^2$ and $R^3$ may or may not be substituted by groups which do not confer solubility.

The colorants of the formula (I), when used in surface coatings, printing inks and plastics, give red to bluish red hues when X is a radical of barbituric acid, bluish red to brownish red hues when X is a radical of cyanoacetamide with $R^1$ a phenylic or heterocyclic group, and orange hues when $R^1$ is hydrogen, alkyl or benzyl. The colorations have good lightfastness and fastness to migration.

In addition to the specific meanings already mentioned, $R^1$, $R^2$ and $R^3$ may also be $C_1$–$C_4$-alkyl, i.e. n-butyl, isobutyl, sec.-butyl, n-propyl, isopropyl, ethyl and methyl.

$R^1$ may also be a 5-membered or 6-membered, unsaturated heterocyclic radical which may or may not be benzo-fused, for example thiazol-2-yl, benzothiazol-2-yl, 6-methoxybenzothiazol-2-yl and 1,2,4-triazol-3-yl.

The phenyl, naphthyl and benzo radicals may be substituted by groups which do not confer solubility.

For the purposes of the present invention, groups or substituents which do not confer solubility are those which do not cause the colorant to be soluble either in water or in organic solvents. Examples of such substituents are halogen, alkyl or alkoxy, each of 1 to 6 carbon atoms, nitro, trifluoromethyl, carbamyl, ureido, sulfamyl and cyano; alkoxycarbonyl, alkanoyl, N-alkylcarbamyl, N-alkylureido and alkanoylamino, each of a total of 2 to 6 carbon atoms; alkylsulfonyl and alkylsulfamyl, each of 1 to 6 carbon atoms; aryloxycarbonyl, aroyl, aroylamino, arylsulfonyl, N-arylcarbamyl, N-arylsulfamyl, aryl, N-arylureido and arylazo, and fused-on 5-membered and 6-membered hetero-rings which contain a

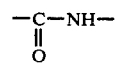

group in the ring.

Preferred groups which do not confer solubility are chlorine, bromine, methyl, ethyl, methoxy and ethoxy. The number of these groups may be up to 3, but is preferably 0 or 1.

Amongst the compounds of the formula (I), preferred compounds, for tinctorial and technological reasons, are those of the formulae (II) and (III):

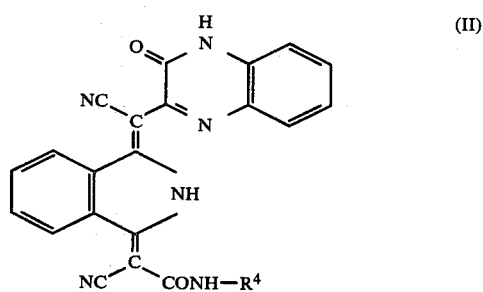

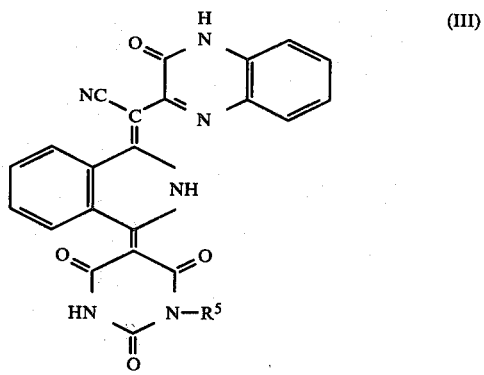

where $R^4$ is unsubstituted or chlorine-, bromine-, methyl-, ethyl-, methoxy- and/or ethoxy-substituted phenyl or 1-naphthyl and $R^5$ is hydrogen, $C_1$–$C_4$-alkyl, or chlorine-, bromine-, methyl-, ethyl-, methoxy- and/or ethoxy-substituted phenyl, the number of substituents being up to 2, and the substituents, where two are present, being identical or different.

The colorants of the formula (III) are particularly preferred, and amongst these the colorant wherein $R^5$ is hydrogen is more especially preferred.

The colorants of the formula (I) are prepared by conventional methods, through stepwise condensation of 1,3-diimino-isoindoline with the corresponding CH—acidic compounds.

First, 1,3-diiminoisoindoline is condensed with a compound of the formula

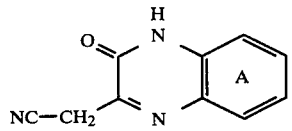

in a molar ratio of 1:1; the reaction product (i.e. the semi-condensation product) of the formula

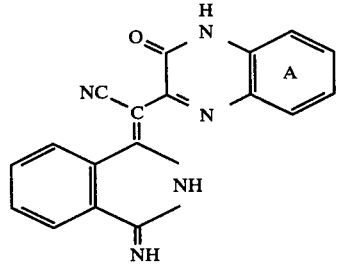

is then condensed with 1 mole of the compound

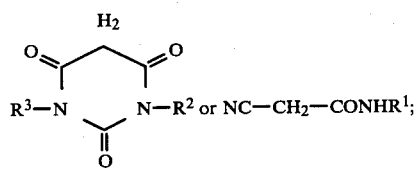

in these formulae, $R^1$, $R^2$, $R^3$ and A have the above meanings.

The condensation of the diiminoisoindoline with the cyanomethylene-active compounds of the formula IV is preferably carried out in water or in an organic solvent or diluent, for example an aliphatic alcohol of 1 to 4 carbon atoms, eg. methanol, ethanol, isopropanol or butanol, a glycol or glycol-ether, an open-chain or cyclic amide, eg. dimethylformamide, dimethylacetamide or N-methylpyrrolidone, or a mixture of the above solvents. The use of a slight excess of diiminoisoindoline can be advantageous. The amount of solvent and diluent is not critical per se, and is chosen to ensure stirrability or miscibility of the reaction batch. The reaction is as a rule carried out at below 100° C.

The condensation of the semi-condensation products of the formula V with the CH-acidic compound of the formula VI or VII is carried out in one of the above solvents or, preferably, in an aliphatic monocarboxylic acid, eg. acetic acid or propionic acid, at from 50 to 150° C.

Both the semi-condensation products of the formula V and the pigments of the formula I precipitate out from the hot mixture and can be isolated in a pure form by filtering off and, where necessary, washing with organic solvents.

If the reaction conditions are suitably chosen, it is also possible to carry out both reaction steps in the same reaction vessel, without intermediate isolation of the semi-condensation product of the formula V.

The crude products obtained can in general be used as pigments. They can however also be converted, by conventional conditioning processes, into the optimum pigmentary form for the envisaged end use.

The Examples which follow illustrate the invention. Parts and percentages are by weight.

EXAMPLE 1

(a) 18.5 parts of 2-cyanomethyl-quinoxalinone and 14.5 parts of 1,3-diiminoisoindoline in 200 parts of methanol and 100 parts of dimethylformamide are stirred for 5 hours at the boil. When the mixture has cooled, the product is filtered off, washed with methanol and dried. 27 parts of the semi-condensation product of the formula

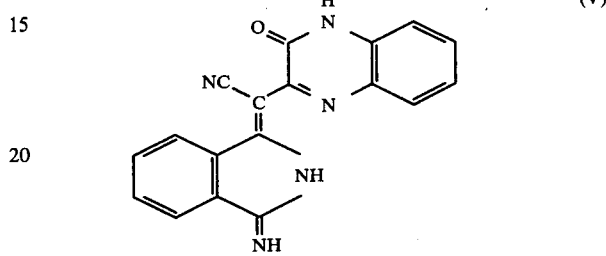

are obtained in the form of a greenish brown powder of melting point >360° C.).

(b) 31 parts of the product obtained as described in (a) and 13 parts of barbituric acid in 800 parts of glacial acetic acid are stirred for 5 hours at the boil. The product is filtered off warm, washed with glacial acetic acid and methanol and dried.

Yield: 34 parts of colorant of the formula (III) where $R^5$ is H. The colorant may be used direct for pigmenting surface coatings, printing inks and plastics. Strongly bluish red colorations, having very good light-fastness and fastness to overcoating, are obtained.

(c) If 10 parts of the colorant obtained as described in (b) are heated for 3 hours in 140 parts of dimethylformamide at 120° C., and the product is then isolated, 9 parts of the colorant are obtained in a violet pigmentary form, which gives deep colorations having improved lightfastness.

EXAMPLES 2 TO 11

The procedure followed is as described in Example 1(a) and (b), but using the compound of the formula (VI) in place of barbituric acid. Colorants of the formula

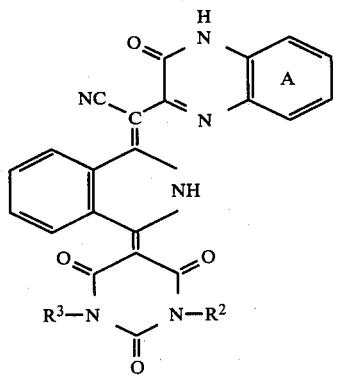

are obtained.

The meanings of A, $R^2$ and $R^3$, and the hue of the colorations obtained with the above pigments are shown in the Table which follows.

| Example | Ring A | $R^2$ | $R^3$ | Hue |
|---|---|---|---|---|
| 2 | unsubst. | —$CH_3$ | —H | red |
| 3 | " | " | —$CH_3$ | " |
| 4 | " | —$C_2H_5$ | —H | " |
| 5 | " |  | —H | " |
| 6 | " | " |  | " |
| 7 | " |  | —H | " |
| 8 | " |  | —H | " |
| 9 | " |  | —H | " |
| 10 | 6/7-$CH_3$[(1)] | H | —H | " |
| 11 | 6/7-$OCH_3$[(1)] | H | —H | " |

[(1)]A mixture of the 6-substituted and 7-substituted compound.

EXAMPLE 12

(b) 31 parts of the semi-condensation product (V), prepared as described in Example 1(a), and 15 parts of cyanoacetanilide in 600 parts of glacial acetic acid are boiled for 5 hours. When the mixture has cooled, the colorant is isolated.

Yield: 30 parts of the colorant of the formula (II), where $R^4$ is

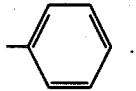

The product can be used direct for pigmenting surface coatings, printing inks and plastics. Deep, strongly bluish red colorations, which have very good lightfastness and fastness to overcoating, are obtained.

(c) 10 parts of the product obtained as described in (b), in 150 parts of dimethylformamide, are stirred for 3 hours at 120° C. Isolating the product gives 8 parts of the colorant in a violet pigmentary form, which produces colorations having improved lightfastness.

EXAMPLES 13 TO 23

The procedure described in Example 12(b) is followed, but instead of cyanoacetanilide itself, other compounds of the formula VII are used. Colorants of the formula (II) are obtained. The meanings of $R^1$ or $R^4$, and the hue of the colorations obtained with the products, are shown in the Table which follows.

| Example | $R^1$ ($R^4$) | Hue |
|---|---|---|
| 13 | —H | orange |
| 14 | —$CH_3$ | " |
| 15 | —$C_2H_5$ | " |
| 16 | 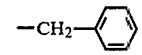 | " |
| 17 | 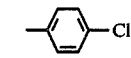 | brownish red |
| 18 | 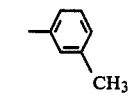 | " |
| 19 |  | " |
| 20 | 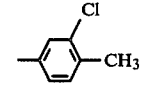 | " |
| 21 | 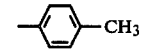 | " |
| 22 | 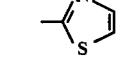 | " |
| 23 | 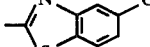 | " |

EXAMPLE 24 (USE EXAMPLE)

(a) Finish 10 parts of the colorant obtained as described in Example 1 and 95 parts of a baking finish mixture which contains 70% of coconut alkyd resin (60% strength solution in xylene) and 30% of melamine resin (about 55% strength solution in butanol/xylene), are ground in an attrition mill. After applying the finish and baking it for 30 minutes at 120° C., red full-shade coatings having good lightfastness and fastness to overspraying are obtained. If titanium dioxide is added to the formulation, red white reductions are obtained.

If the colorants of Examples 2 to 23 are used, coatings in similar orange to red hues, and having similar properties, are obtained.

(b) Plastic 0.5 part of the colorant obtained as described in Example 1 is tumbled with 100 parts of polystyrene granules. The dry-colored granules obtained are homogenized by extrusion at 190°–195° C. Red extrudates, in which the coloration has good lightfastness, are obtained.

If mixtures of 0.5 part of colorant and 1 part of titanium dioxide are used, high-hiding red colorations are obtained.

Similar colorations are obtained with the pigments of Examples 2 to 23.

(c) Printing ink 8 parts of the pigment obtained as described in Example 1, 40 parts of a phenol/formaldehyde-modified rosin and 55–65 parts of toluene are mixed thoroughly in a disperser. A red toluene-based gravure ink is obtained, which gives very lightfast prints.

Similar results are obtained with the colorants of Examples 2 to 23.

We claim:

1. An isoindoline colorant of the general formula

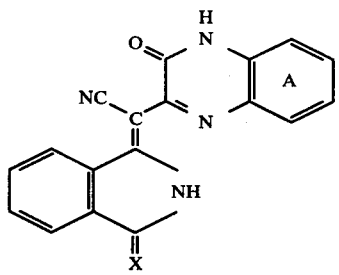

wherein X is a radical of the formula

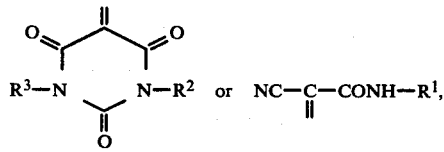

$R^1$ is hydrogen, $C_1$–$C_4$-alkyl, benzyl, phenyl, 1-naphthyl, thiazol-2-yl, benzothiazol-2-yl or 1,2,4-triazol-3-yl, $R^2$ and $R^3$, independently of one another, are hydrogen, $C_1$–$C_4$-alkyl, benzyl, phenyl or 1-naphthyl, and the ring A and the phenyl, naphthyl and heterocyclic radicals in $R^1$, $R^2$ and $R^3$ may or may not be substituted by groups which do not confer solubility either in water or in organic solvents.

2. An isoindoline colorant as claimed in claim 1, wherein the ring A, the phenyl radicals, the naphthyl radicals and the heterocyclic radicals in $R^1$, $R^2$ and $R^3$ are unsubstituted or mono-, di- or tri-substituted by chlorine, bromine, methyl, ethyl, methoxy or ethoxy, the substituents being identical or different.

3. An isoindoline colorant of the formula

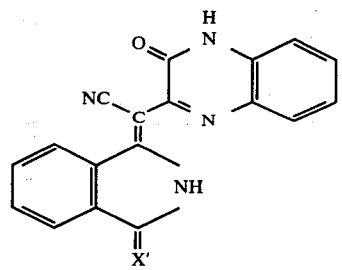

where X' is a radical of the formula

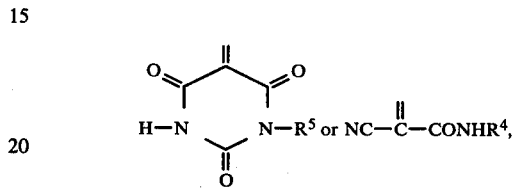

$R^4$ is phenyl or 1-naphthyl, either of which is unsubstituted or mono- or di-substituted by chlorine, bromine, methyl, ethyl, methoxy or ethoxy, and $R^5$ is hydrogen, $C_1$–$C_4$-alkyl, or phenyl which is unsubstituted or mono- or di-substituted by chlorine, bromine, methyl, ethyl, methoxy or ethoxy, in the case of disubstitution the substituents on the phenyl radical $R^4$ or $R^5$ and on the naphthyl radical $R^4$ being identical or different.

4. An isoindoline colorant as claimed in claim 3, wherein the phenyl radicals $R^4$ and $R^5$ are the naphthyl radical $R^4$ are unsubstituted or mono- substituted by chlorine, bromine, methyl, ethyl, methoxy or ethoxy.

5. An isoindoline colorant of the formula

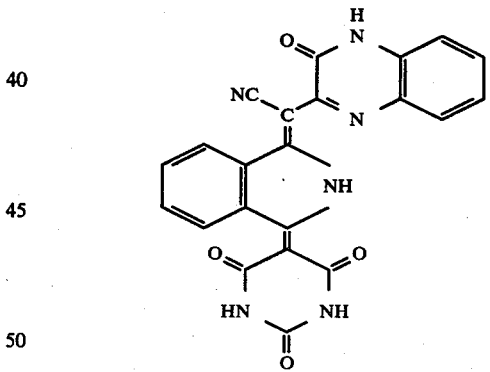

* * * * *